3,144,389
2-HYDROXY-2-PHENYL-ETHYL CARBAMATE FOR MUSCLE RELAXATION

Charles D. Bossinger, Kankakee, and Kelley G. Taylor, Decatur, Ill., assignors to Armour Pharmaceutical Company, Chicago, Ill., a corporation of Delaware
No Drawing. Filed June 26, 1962, Ser. No. 205,200
5 Claims. (Cl. 167—65)

This invention relates to a method of promoting muscle relaxation. It also relates to a muscle relaxant composition.

This application is a continuation-in-part of copending application Serial No. 729,554, filed April 21, 1958 and of Serial No. 38,763, filed June 27, 1960. Application Serial No. 38,763 was a continuation-in-part of application Serial No. 729,553, filed April 21, 1958, and applications Serial Nos. 729,553 and 729,554 were continuations-in-part of parent application Serial No. 554,132, filed December 20, 1955. The applications having Serial Nos. 554,132, 729,553 and 38,763 are now abandoned.

It is an object of this invention to provide a method of promoting muscle relaxation. A more general object is to provide a method of treating the central nervous system wherein muscle relaxation is one of the primary effects obtained. More specifically, it is an object to provide a muscle relaxant composition and a method of promoting muscle relaxation which are adapted to achieve this result with a minimum of sedation and tranquilization. Further objects and advantages will be indicated in the following detailed specification.

This invention is based primarily on the discovery that 2-hydroxy-2-phenyl ethyl carbamate has specific and unique properties when administered to humans for treatment of the central nervous system. This carbamate compound differs from other carbamate compounds which are otherwise closely related in structure in that it is an effective muscle relaxant without at the same time having any marked or substantial action as a sedative or as a tranquilizer. The carbamate compound used in the method and composition of this invention has the following structural formula:

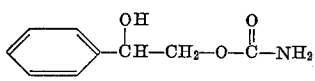

The foregoing compound can be prepared by the process described in copending application Serial No. 816,700, filed May 29, 1959, now U.S. Patent No. 3,066,164. In this process, a 1,2-glycol is converted to the corresponding carbonate, and the carbonate is subjected to ammonoylsis to obtain the desired carbamate. Preferably, the 1,2-glycol is condensed with a halo-formic ester to obtain an acyclic carbonate which is then subjected to ammonolysis to obtain the desired monocarbamate. Since the particular process for preparing the carbamate compound does not form a part of the present invention, it is not believed it will be necessary to further describe processes for its preparation herein, except as illustrated by the following examples.

In utilizing the carbamate compound described above for central nervous system treatment and particularly to promote muscle relaxation, it is preferred to administer the compound orally. Since the compound is well-absorbed orally, there will usually be no reason to resort to parenteral administration. The compound can be used in this way for conditions such as strains, stiff necks, and other conditions where the need for muscle relaxation is indicated.

For oral administration, it is preferred to combine the carbamate compound with a pharmaceutical carrier. The proportions of the carrier and carbamate compound are not critical, and they will vary considerably depending on whether the composition is to be filled into capsules or formed into tablets. In tableting, it will usually be desirable to employ at least as much of the pharmaceutical carrier as the carbamate compound. Various edible pharmaceutical carriers, or mixtures thereof can be used. For example, a mixture of lactose, dibasic calcium phosphate, and cornstarch is suitable. Additional ingredients can be included, such as lubricants like magnesium stearate.

When administering 2-hydroxy-2-phenyl ethyl carbamate for central nervous system treatment, the total daily dose will usually fall within the range from 400 to 2,000 milligrams of the carbamate compound per 24 hour period. Typically, the daily dose will range from 600 to 1,600 milligrams. In practicing the method of this invention, it will therefore be convenient to have the carbamate compound combined with the pharmaceutical carrier and prepared in tablets or other dosage unit form. Each tablet or dosage unit can contain from 50 to 600 milligrams of the carbamate compound. For example, tablets containing 200 milligrams of the carbamate compound can be administered either 1 tablet three times a day to achieve a daily dose of 600 milligrams, or up to 2 tablets four times a day to achieve a daily dose of 1,600 milligrams.

The present invention is further illustrated by the following specific examples.

Example 1

The following method was utilized in preparing 2-hydroxy-2-phenyl ethyl carbamate:

A solution of 32.0 gms. (0.3 mole) of phosgene in 200 ml. of benzene was added dropwise to a stirred solution of 44.2 gms. of styrene glycol (0.3 mole) in 400 ml. of benzene. The solutions were maintained at a temperature of 30° C. during the addition.

The resulting reaction mixture was stirred for a period of 1 hour, whereafter 48.0 gms. of diethylaniline in 100 ml. of benzene was added and the mixture stirred for an additional hour. About 500 ml. of ice water was then added to the flask, and the benzene layer thereupon formed separated from the aqueous layer and washed with an additional 500 ml. of ice water.

To the benzene-soluble fraction was added 500 ml. of a 30% aqueous ammonium hydroxide solution, and thereafter the resulting mixture was maintained at a temperature of 5° C. for a period of 3 hours. Upon standing, needle-shaped crystals were formed, and such crystals were separated from the mother liquor. Crystallization can be facilitated by the removal of excess ammonia from the crystallization mixture under reduced pressure. The yield of crystals was 30 gms. An additional amount of reaction product was recovered from this mother liquor. The combined yield, after recrystallization from chloroform, was 40.5 gms. The melting point of the reaction product was 111–112° C.

This reaction product was subjected to analysis, and the results were as follows:

|  | C | H | N |
|---|---|---|---|
| Calculated | 59.65 | 6.12 | 7.73 |
| Analyzed | 59.55 | 6.15 | 7.67 |
|  | 59.75 | 6.17 | 7.54 |

Example 2

The following method was employed in the preparation of tablets of 2-hydroxy-2-phenyl ethyl carbamate:

To 5½ gallons of boiling water was added a slurry of 7 pounds 8 ounces of cornstarch in 1½ gallons of cold water, with stirring, to obtain a uniform translucent paste. This paste was cooled to a temperature of 150° F.

There was combined in a mixing vessel 140 pounds of 2-hydroxy-2-phenyl ethyl carbamate, 14 pounds of peach color concentrate and 56 pounds of dibasic calicum phosphate, and the resulting mixture was stirred for about 5 minutes. This mix was passed through a No. 2B screen in a Fitzmill operating at high speed with impact forward.

In the mixer, the starch paste was added to the milled mix in a slow steady stream, and divided portions each of approximately 2 gallons. The resulting mixture was then mixed for approximately 5 minutes until a fairly stiff mass had been obtained. This granulation was passed through a 4 mesh screen in an oscillating granulator.

The wet granulation was spread on paper-covered trays in layers of approximately ½ inch in thickness. The spread granulation was dried overnight at a temperature of 140° F. This was dried in circulating air ovens.

This dry material was passed through a 12 mesh screen in an oscillating granulator. Then, in a stainless steel drum mixer, there was added to the dry granulation 1 pound 4 ounces of magnesium stearate, and the resulting mixture was stirred for about 15 minutes.

This tableting mixture was compressed into tablets, employing ⅜" flat, beveled-edge punches.

There was obtained in this process 315,000 tablets, each weighing 4.82 grains and containing 200 mg. of 2-hydroxy-2-phenyl ethyl carbamate.

While in the foregoing specification many details have been set forth for purpose of illustration, it will be apparent to those skilled in the art that certain of the details set forth herein can be varied considerably without departing from the invention as defined by the following claims.

We claim:

1. The method of promoting muscle relaxation, comprising orally administering 2-hydroxy-2-phenyl ethyl carbamate.

2. The method of promoting muscle relaxation, comprising orally administering from 400 to 2,000 milligrams per 24 hour period of 2-hydroxy-2-phenyl ethyl carbamate.

3. The method of promoting muscle relaxation comprising orally administering to a human 2-hydroxy-2-phenyl ethyl carbamate.

4. The method of promoting muscle relaxation, comprising orally administering dosage units of a composition comprising 2-hydroxy-2-phenyl ethyl carbamate and a pharmaceutical carrier.

5. A muscle relaxant composition in dosage unit form, comprising about 50 to 600 milligrams of 2-hydroxy-2-phenyl ethyl carbamate in admixture with a pharmaceutical carrier.

No references cited.